UNITED STATES PATENT OFFICE.

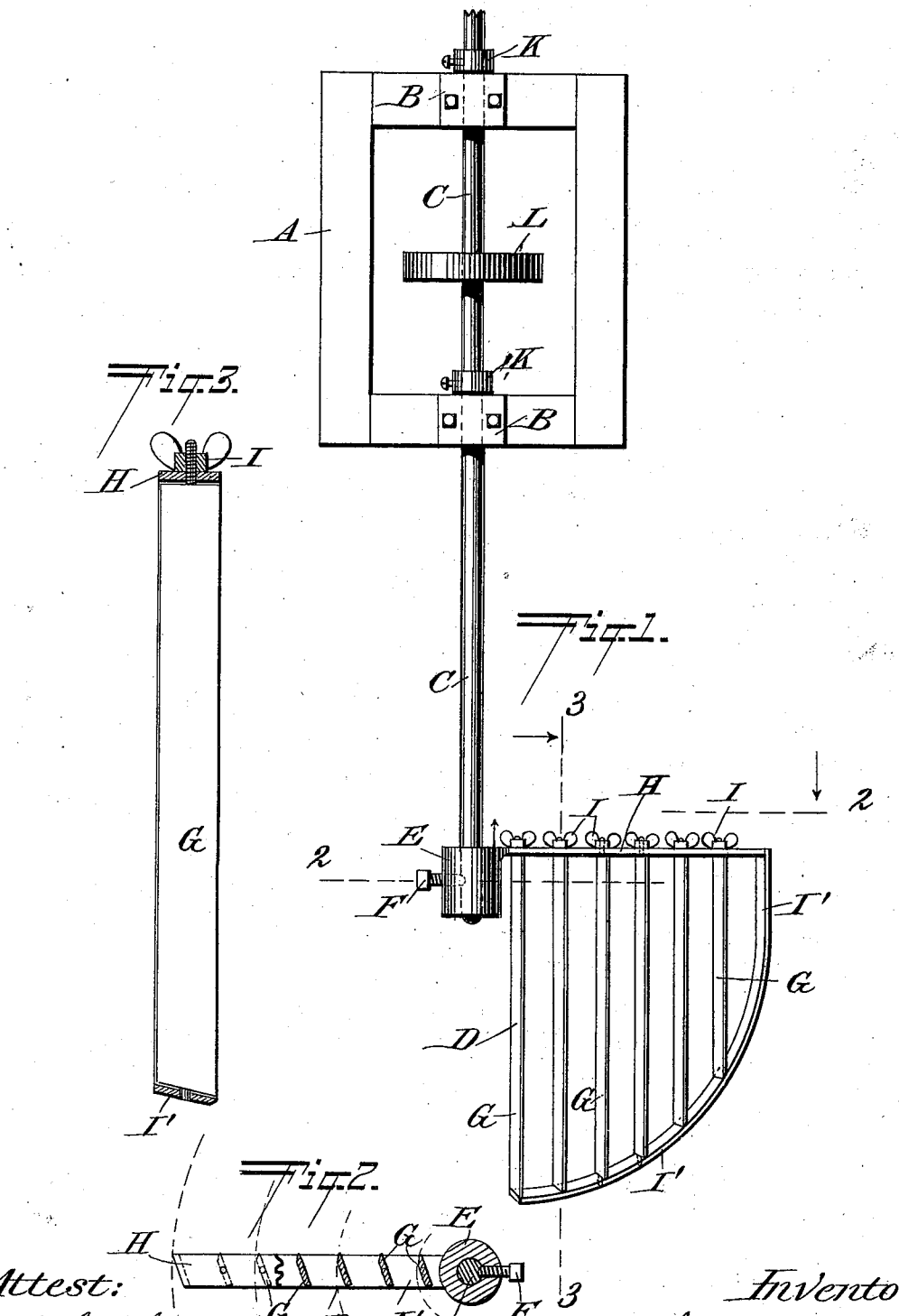

ADDISON HANCOCK, OF ALLEGHENY, PENNSYLVANIA.

MIXER AND STIRRER.

SPECIFICATION forming part of Letters Patent No. 504,472, dated September 5, 1893.

Application filed June 3, 1893. Serial No. 476,493. (No model.)

*To all whom it may concern:*

Be it known that I, ADDISON HANCOCK, of Allegheny, in the county of Allegheny and State of Pennsylvania, have invented certain new and useful Improvements in Mixers and Stirrers; and I do hereby declare the following to be a full, clear, and exact description of the invention, such as will enable others skilled in the art to which it appertains to make and use the same.

My invention relates to improvements in mixers and stirrers, the object of the same being to provide a device of this character by means of which the material to be stirred will be drawn away from the sides and the bottom of the containing kettle.

With these ends in view, my invention consists in the certain features of construction and combinations of parts, as will be hereinafter fully described and pointed out in the claims.

In the drawings, Figure 1 is a side view of the machine. Fig. 2 is a horizontal section on line 2—2 of Fig. 1. Fig. 3 is a vertical sectional view of the same, on line 3—3 of Fig. 1.

A represents the suspension frame of the device provided with the brackets B, in which is journaled the shaft C. The dasher D is mounted on said shaft by means of the collar E and is vertically adjustable thereon, the same being held in any desired position by means of the set screw F. The slats G of the dasher are journaled at their upper ends in the cross piece H, and are adjustable therein by means of the set screws I. The slats G are inclined at an angle to the path of their rotation and are secured at their lower ends in a similarly inclined rim I'. The collars K K are for the purpose of regulating the vertical movement of the shaft, which is driven by means of the belt wheel L. The dasher is placed about one half inch from the sides and bottom of the vessel, and through the inclination of the slats and rim as described, the contents therein are drawn away from the bottom and sides of the vessel. When the contents of the vessel have been sufficiently mixed, the dasher is raised from the vessel and locked in elevated adjustment on the shaft, thereby enabling free access to the vessel.

Having described my invention, what I claim is—

1. In a mixer and stirrer, the combination with the stirrer shaft, of a dasher secured to the said shaft, a series of vertical slats inclined at an angle to the path of their rotation, pivoted in said dasher, and a segmental rim I secured to said slats, substantially as described.

2. In a mixer and stirrer, the combination with the stirrer shaft, of a dasher secured to said shaft, a series of adjustable vertical slats inclined at an angle to the path of their rotation pivoted in said dasher, and a segmental rim I secured to said slats, substantially as described.

3. In a mixer and stirrer, the combination with the stirrer shaft, of a vertical adjustable dasher secured thereto, a series of vertical slats inclined at an angle to the path of their rotation, and a segmental rim I in which are secured the lower ends of said slats, substantially as described.

In testimony whereof I have signed this specification in the presence of two subscribing witnesses.

ADDISON HANCOCK.

Witnesses:
S. G. HOPKINS,
F. H. SMITH.